(12) United States Patent
Fullerton et al.

(10) Patent No.: US 9,116,252 B2
(45) Date of Patent: Aug. 25, 2015

(54) SYSTEM AND METHOD FOR COUPLING AN OVERPRESSURE WAVE TO A TARGET MEDIA

(71) Applicant: Soundblast Technologies LLC, Winter Park, FL (US)

(72) Inventors: Larry W. Fullerton, New Hope, AL (US); James L Teel, Winter Park, FL (US); Herman M Thompson, Jr., Kelso, TN (US)

(73) Assignee: Soundblast Technologies LLC, Winter Park, FL (US)

( * ) Notice: Subject to any disclaimer, the term of this patent is extended or adjusted under 35 U.S.C. 154(b) by 0 days.

(21) Appl. No.: 14/176,068

(22) Filed: Feb. 8, 2014

(65) Prior Publication Data

US 2014/0326531 A1    Nov. 6, 2014

Related U.S. Application Data

(63) Continuation-in-part of application No. 13/669,985, filed on Nov. 6, 2012, now Pat. No. 8,905,186, which is a continuation-in-part of application No. 13/049,386, filed on Mar. 16, 2011, now Pat. No. 8,302,730, which is a continuation-in-part of application No. 11/785,327, filed on Apr. 17, 2007, now Pat. No. 8,292,022.

(60) Provisional application No. 60/792,420, filed on Apr. 17, 2006, provisional application No. 60/850,685, filed on Oct. 10, 2006, provisional application No. 61/851,229, filed on Mar. 4, 2013.

(51) Int. Cl.
*G01V 1/13* (2006.01)
*G01V 1/112* (2006.01)
*F42D 3/06* (2006.01)
*F42B 3/02* (2006.01)
*F41H 13/00* (2006.01)

(52) U.S. Cl.
CPC ............ *G01V 1/112* (2013.01); *F41H 13/0081* (2013.01); *F42B 3/02* (2013.01); *F42D 3/06* (2013.01)

(58) Field of Classification Search
CPC ...................................................... G01V 1/13
USPC ....................................................... 181/116
See application file for complete search history.

(56) References Cited

U.S. PATENT DOCUMENTS

| | | | | |
|---|---|---|---|---|
| 4,043,420 A | * | 8/1977 | Zens et al. | 181/117 |
| 4,189,026 A | * | 2/1980 | Elliot et al. | 181/118 |
| 5,873,240 A | * | 2/1999 | Bussing et al. | 60/207 |
| 6,408,614 B1 | * | 6/2002 | Eizenhofer | 60/200.1 |

(Continued)

*Primary Examiner* — Forrest M Phillips
(74) *Attorney, Agent, or Firm* — Vector IP Law Group; Robert S. Babayi

(57) ABSTRACT

An improved seismic exploration system and method involves an overpressure wave generator for generating an overpressure wave and a coupling component for converting a pressure of said generated overpressure wave into a force that produces a conducted acoustic wave in a target media. The coupling component includes a coupling chamber, a push plate assembly including a top plate, piston rod, and an earth plate, a movement constraining vessel including a stabilizing component for constraining movement of the push plate assembly and a sealing component for substantially sealing the coupling component, and a stop component for preventing the movement constraining vessel from striking the earth plate.

20 Claims, 11 Drawing Sheets

(56) References Cited

U.S. PATENT DOCUMENTS

| | | | |
|---|---|---|---|
| 7,882,926 B2 * | 2/2011 | Fullerton | 181/117 |
| 8,136,624 B2 * | 3/2012 | Fullerton | 181/117 |
| 8,172,034 B2 * | 5/2012 | Fullerton | 181/117 |
| 8,292,022 B2 * | 10/2012 | Fullerton | 181/101 |
| 8,302,730 B2 * | 11/2012 | Fullerton | 181/101 |

* cited by examiner

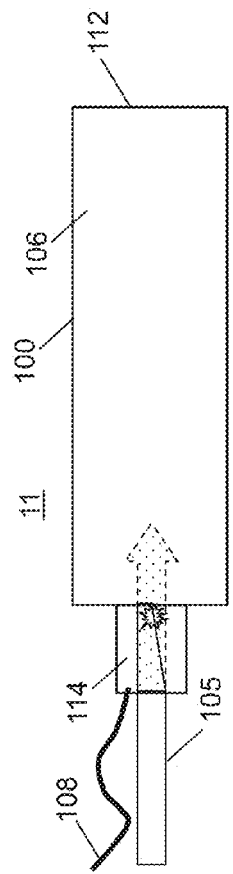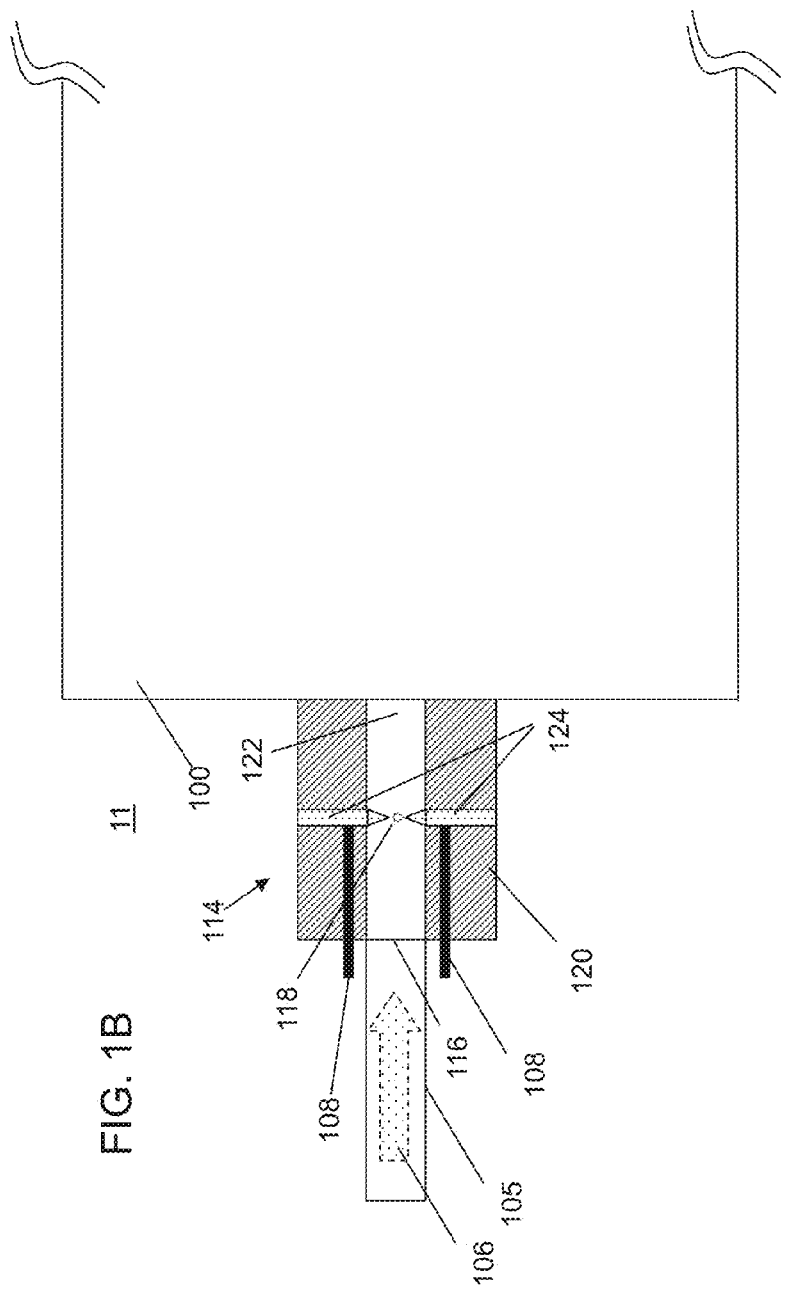

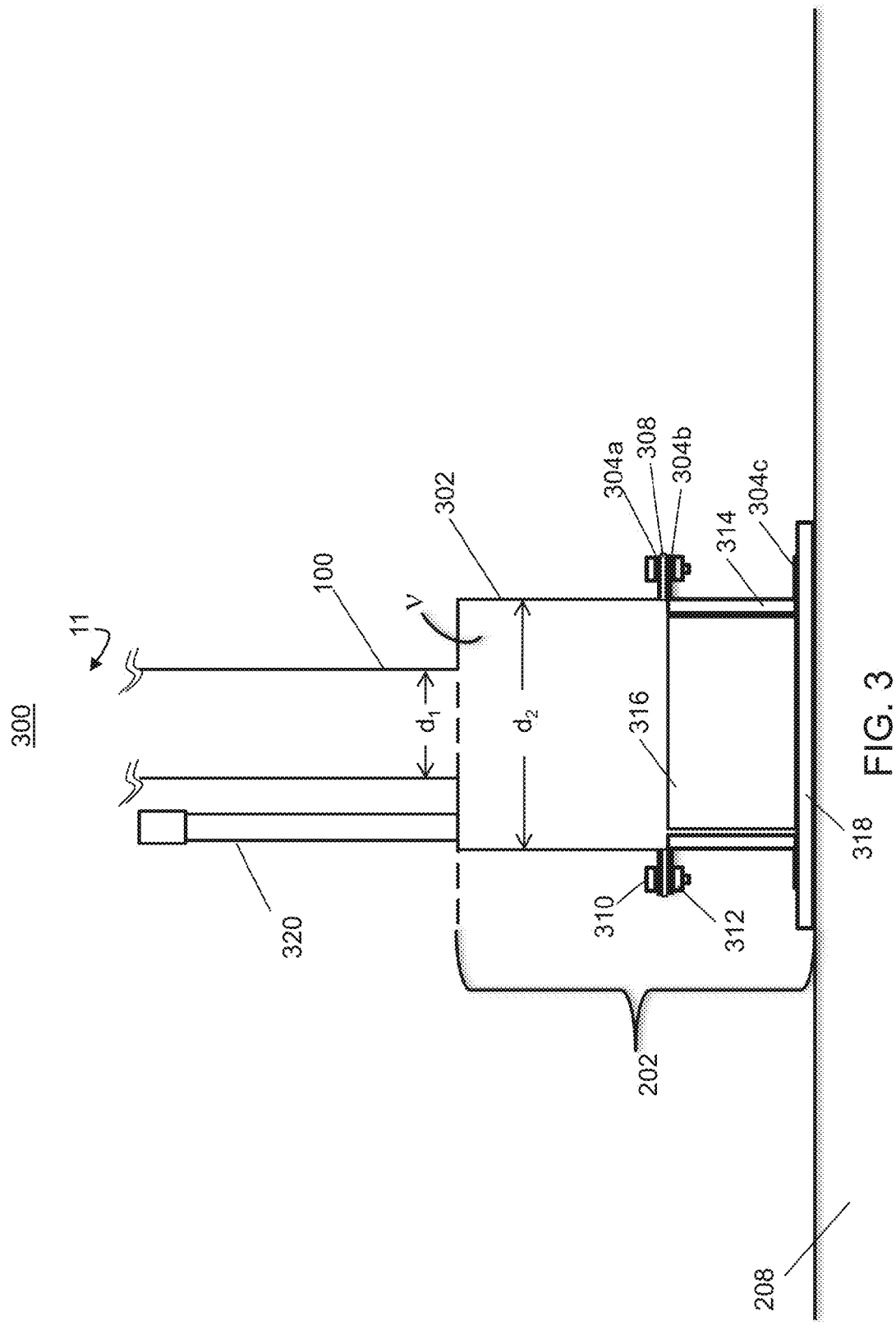

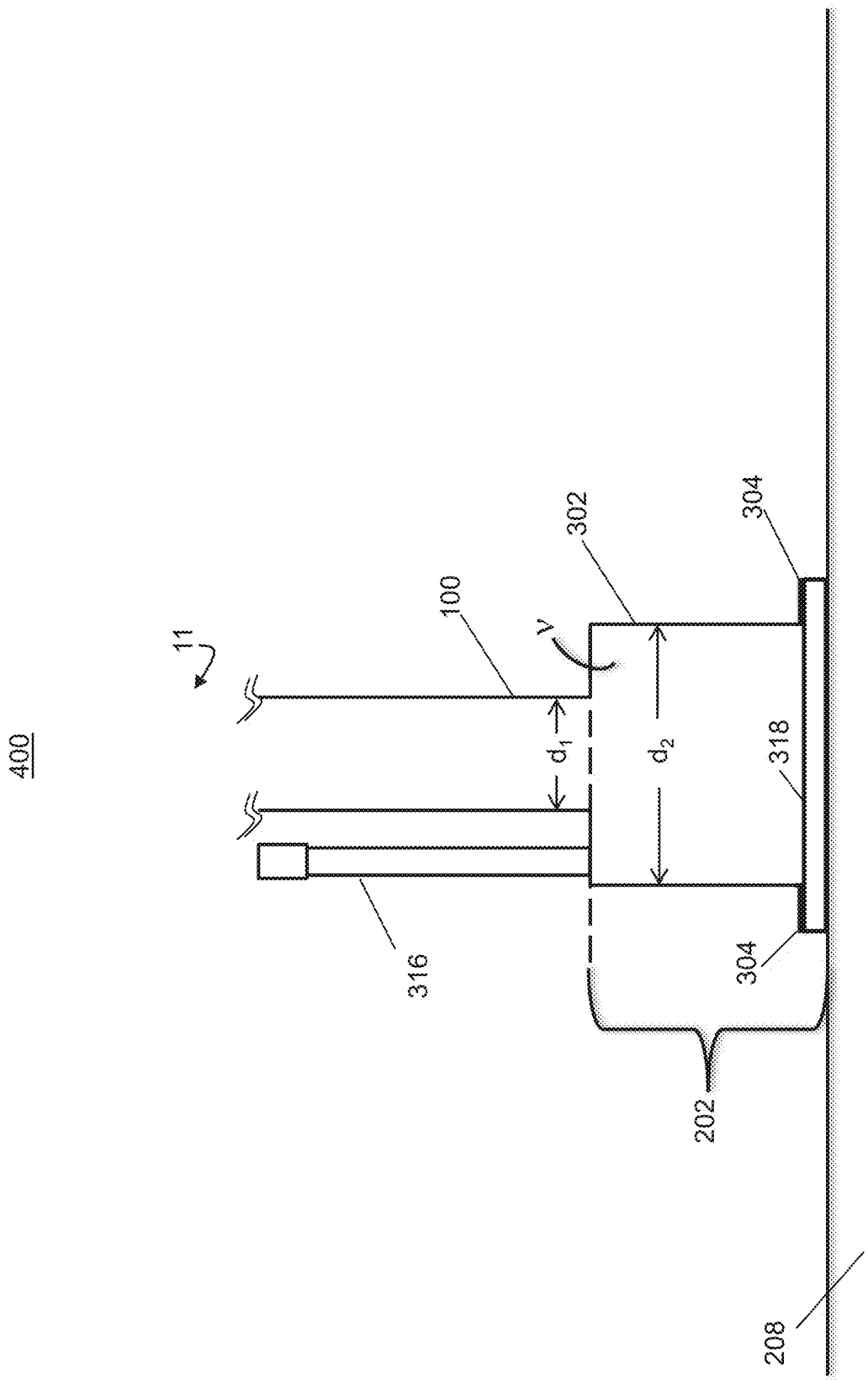

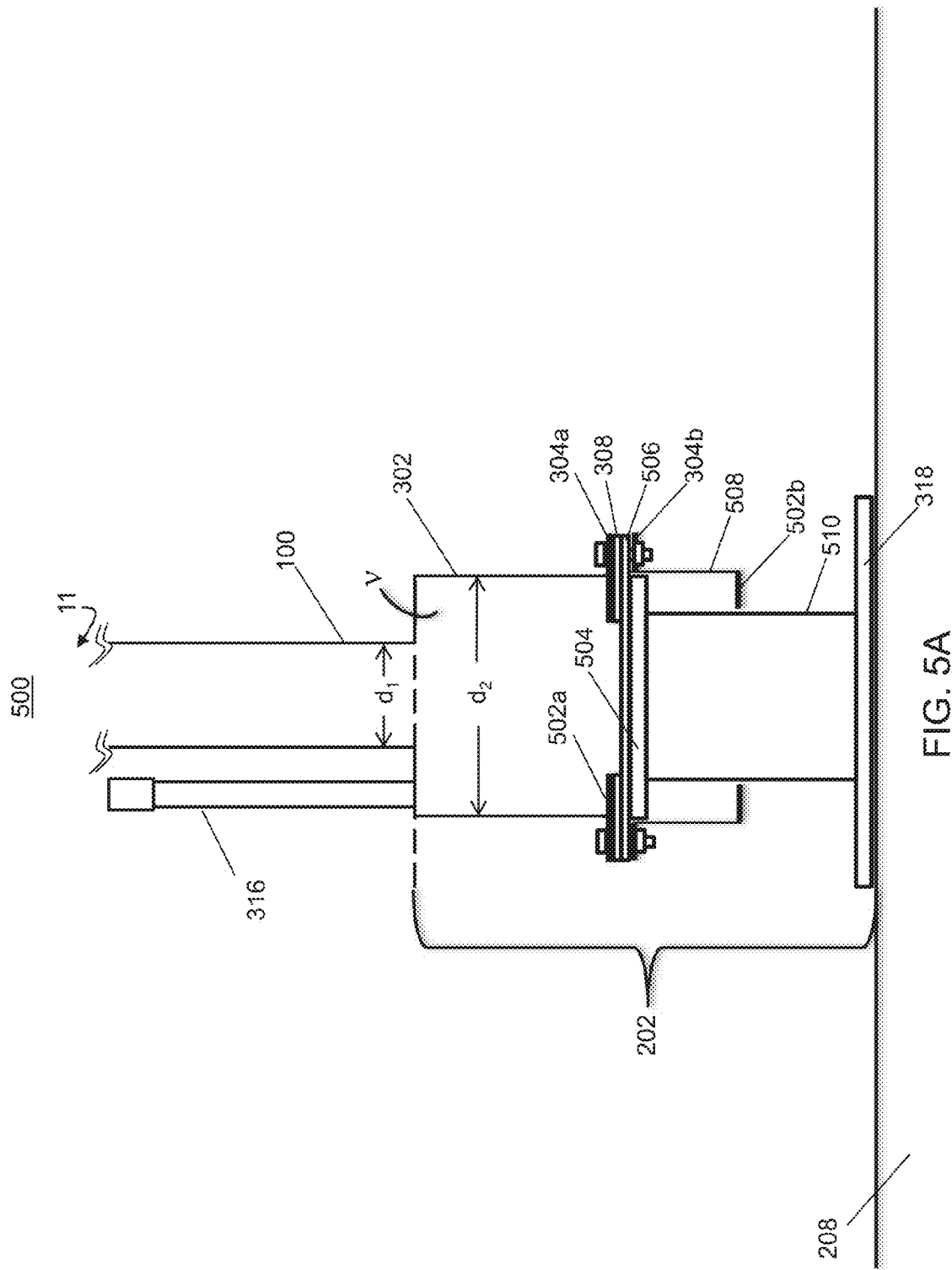

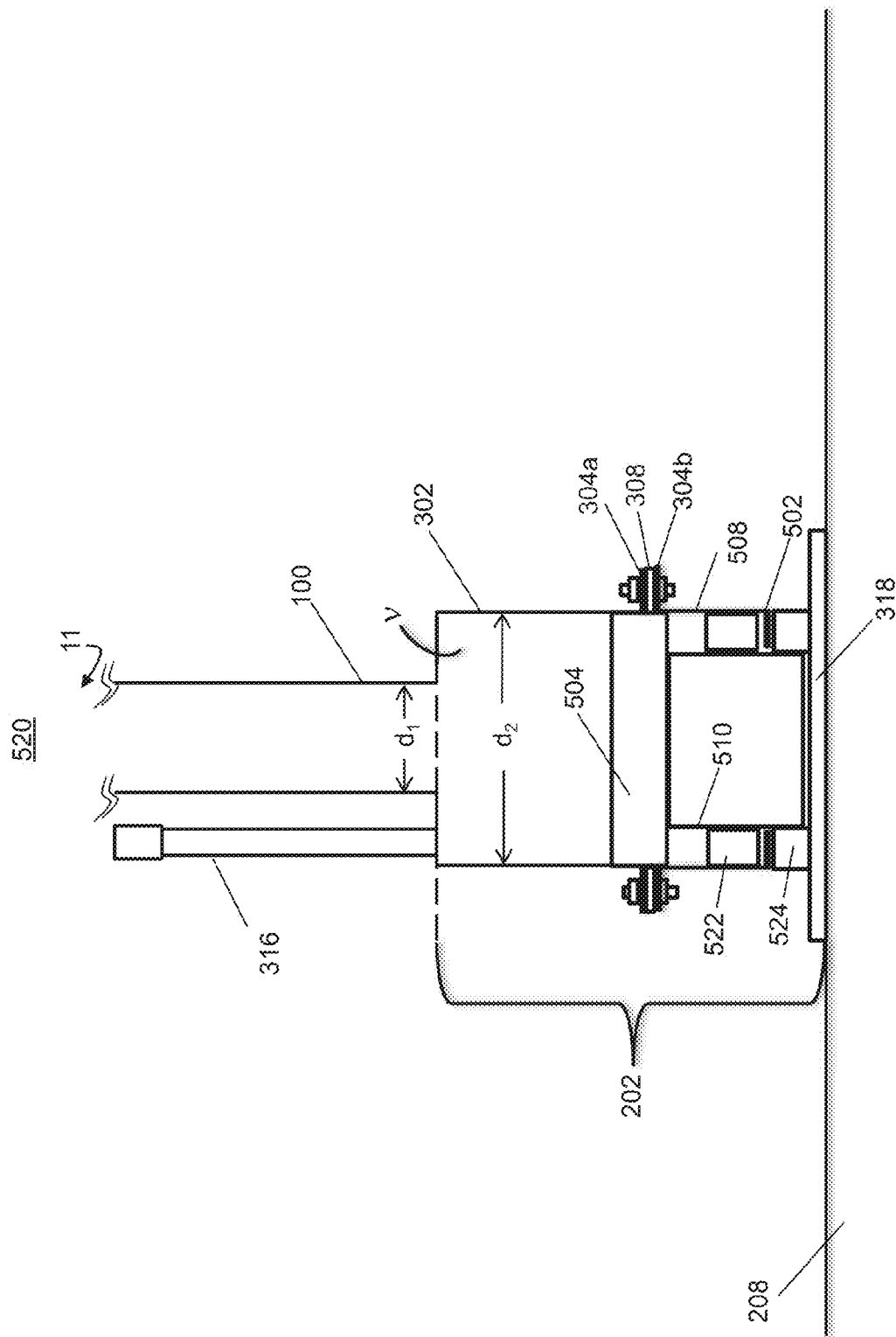

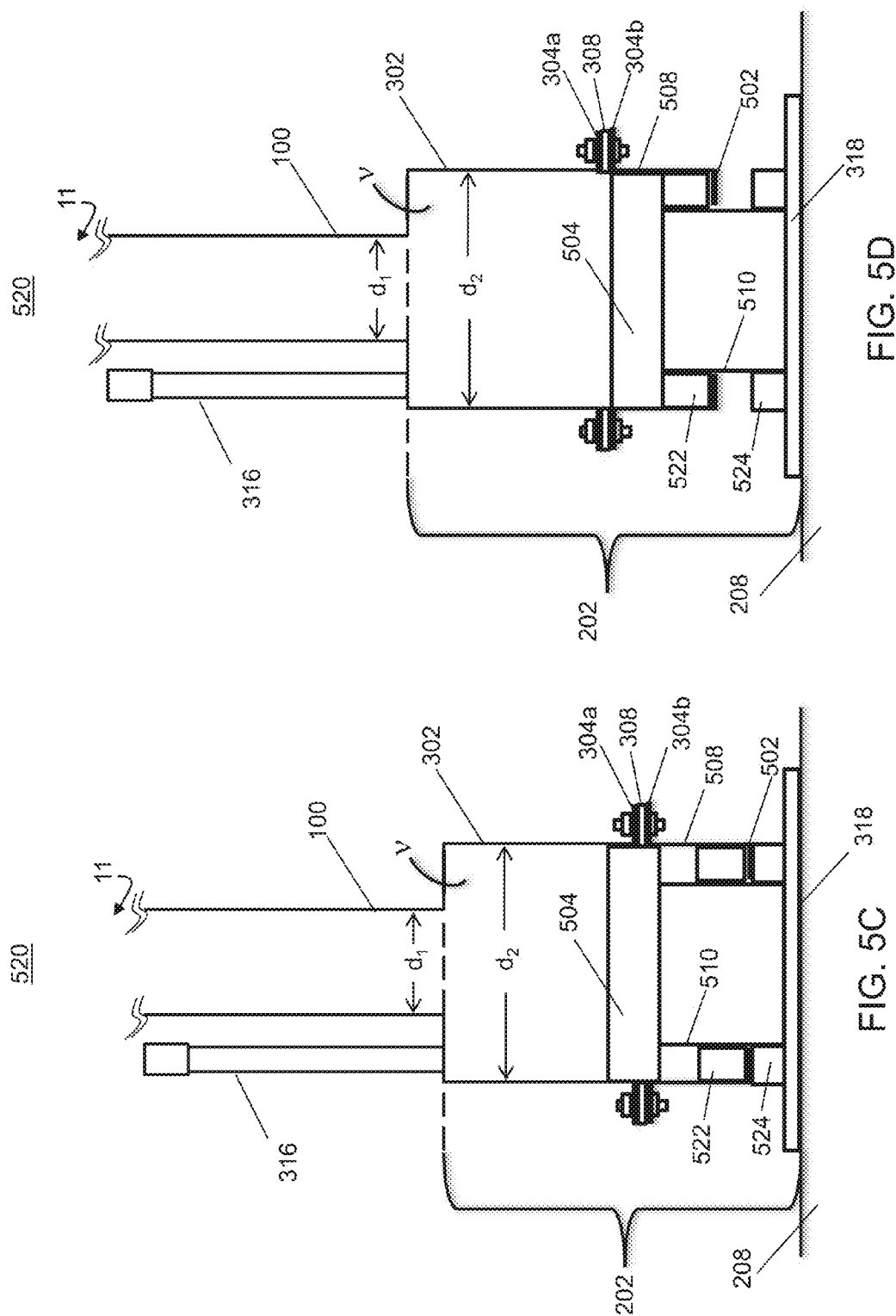

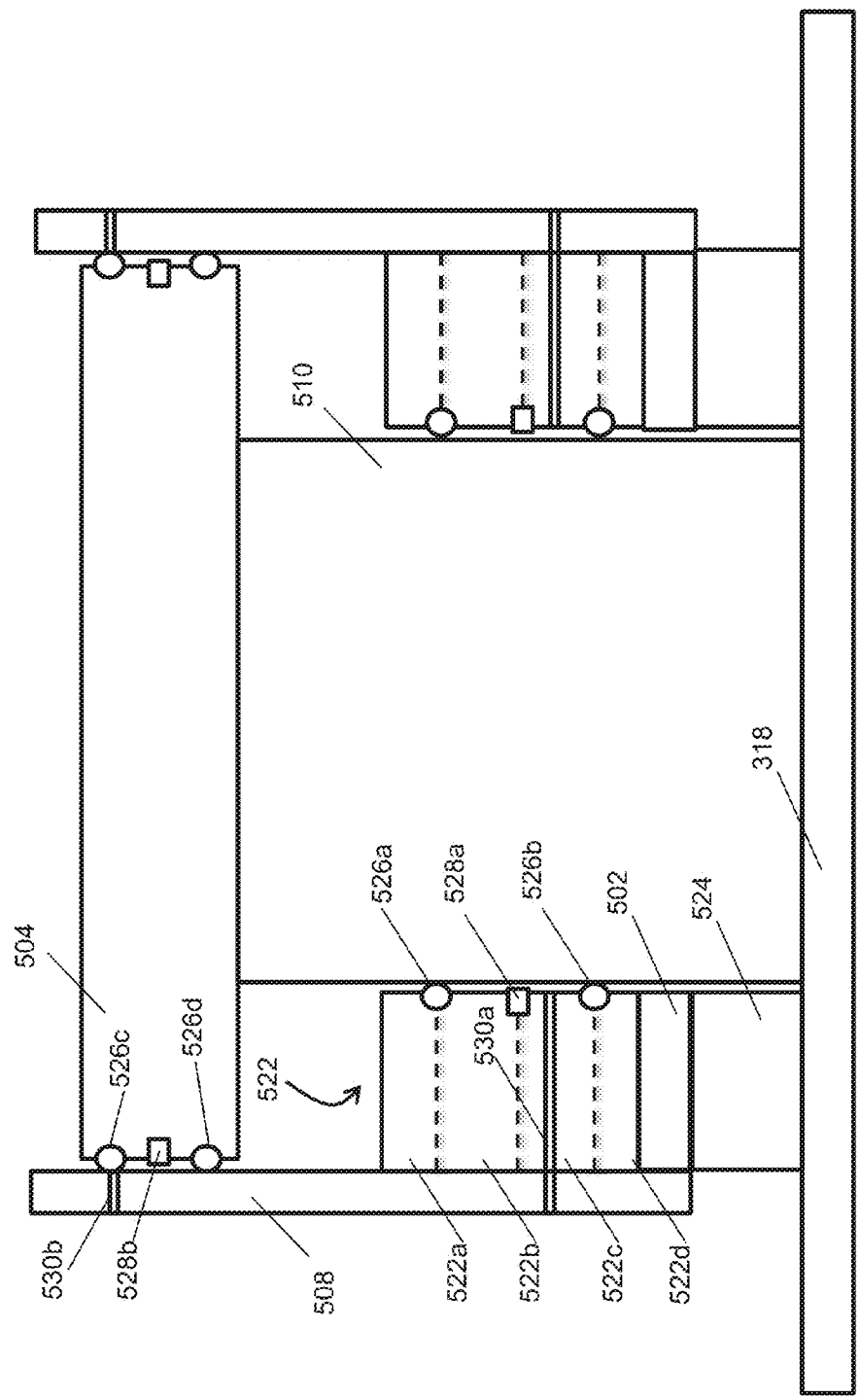

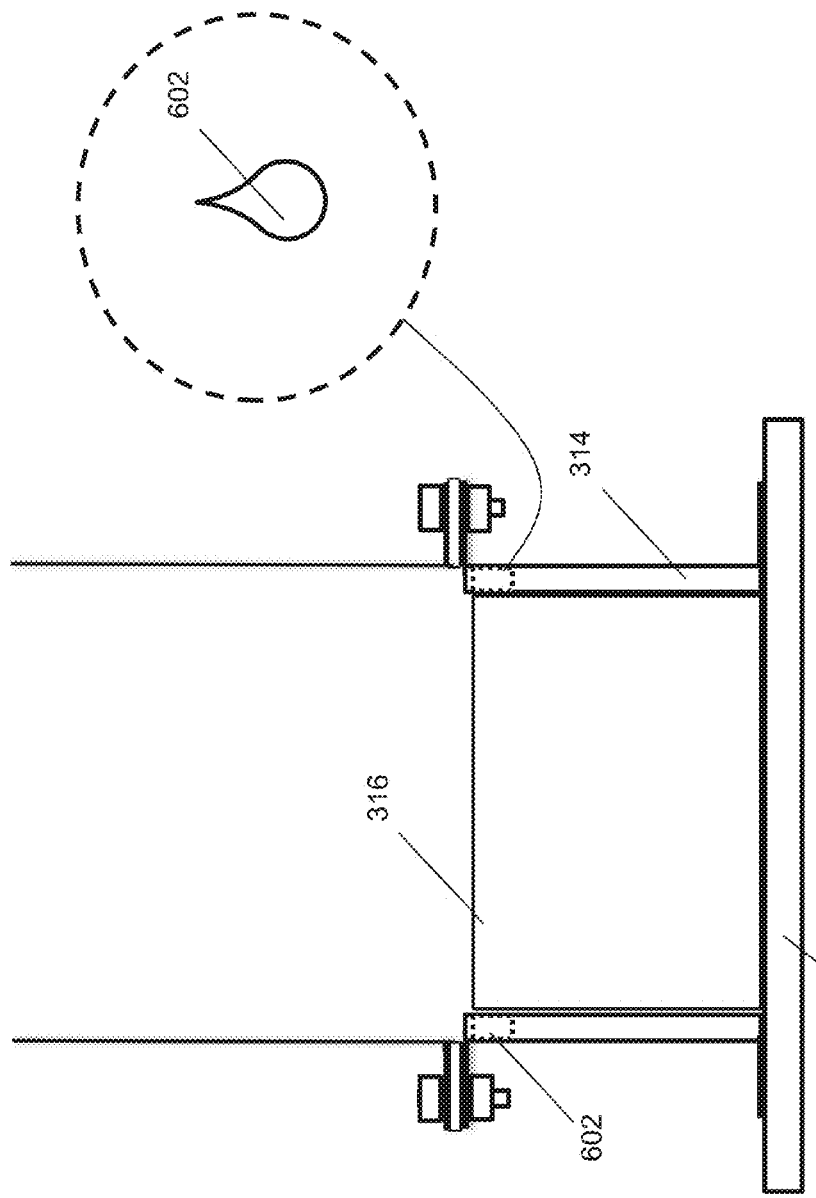

SYSTEM AND METHOD FOR COUPLING AN OVERPRESSURE WAVE TO A TARGET MEDIA

CROSS REFERENCE TO RELATED PATENTS AND PATENT APPLICATIONS

This U.S. Application is a Continuation-in-Part Application of pending U.S. Non-Provisional application Ser. No. 13/669,985, filed Nov. 6, 2012, which is a Continuation-in-Part of U.S. Pat. No. 8,302,730, issued Nov. 11, 2012, which is a Continuation-in-Part of U.S. Pat. No. 8,292,022, issued Oct. 23, 2012, which claims priority to U.S. Provisional Patent Application 60/792,420, filed Apr. 17, 2006, and U.S. Provisional Patent Application 60/850,685, filed Oct. 10, 2006. This application also claims priority to U.S. Provisional Patent Application 61/851,229, filed Mar. 4, 2013, titled "System and Method for Coupling an Overpressure Wave to a Target Media". These related patents and patent applications are all incorporated herein by reference in their entirety.

FIELD OF THE INVENTION

The present invention relates generally to a system and method for coupling an overpressure wave to a target media. More particularly, the present invention relates to a system and method for coupling an overpressure wave to a target media using a coupling component comprising a coupling chamber and a push plate assembly that directly contacts the target media, where a pressure of a generated overpressure wave produced in the coupling chamber is applied to the push plate thereby converting the pressure into a force that produces a conducted acoustic wave in the target media.

SUMMARY OF THE INVENTION

One aspect of the invention involves a seismic exploration system that includes an overpressure wave generator for generating an overpressure wave and a coupling component for converting a pressure of said overpressure wave into a force that produces a conducted acoustic wave in a target media. The coupling component includes a coupling chamber for receiving the overpressure wave from the overpressure wave generator, a push plate assembly including a top plate, a piston rod, and an earth plate, a movement constraining vessel for constraining movement of said push plate assembly resulting from said coupling chamber receiving said overpressure wave including a stabilizing component for constraining movement of said piston rod to only movement that is substantially parallel to the sides of the coupling chamber and the movement constraining vessel and a sealing component for substantially sealing said coupling component during generation of said overpressure wave, and a stop component for preventing said movement constraining vessel from striking said earth plate.

The top plate and the stabilizing component can be configured to limit downward movement of the piston rod and the earth plate, the stop component, and the movement constraining vessel can be configured to limit upward movement of said piston rod.

The stop component can prevent the sound of metal striking metal from being produced by the movement constraining vessel and the earth plate.

The stop component can be a rubber stop component.

The thicknesses of the stop component and the stabilizing component can determine the distance the piston rod can move.

The overpressure wave generator can include a detonator and a detonation tube, where the overpressure wave travels through the detonation tube and into the coupling chamber.

The detonation tube can have a first diameter and the coupling chamber can have a second diameter.

The coupling chamber can be made of one of titanium, aluminum, a composite material, or steel.

The coupling chamber can have a round shape.

The seismic exploration system may also include a vent pipe, which can have at least one of a nozzle, a muffler, or a restrictor.

The sealing component can include a plurality of circular rings and one or more O-rings, where the plurality of circular rings can be attached together by bolts that can be loosened to allow the piston rod to be placed into the movement constraining vessel after which the bolts can be tightened to cause the one or more O-rings to press against the piston rod to substantially seal the coupling component.

The stabilizing component may include a grease port.

The stabilizing component may include at least one of a bushing or a grease spreading component.

The seismic exploration system may a so include at least one vent hole,

One or more O-rings can be integrated into at least one of the top plate or the piston rod.

The overpressure wave generator can be a direct detonation overpressure wave generator.

Another aspect of the invention involves a seismic exploration method that includes generating an overpressure wave using a direct detonation overpressure wave generator and converting a pressure of the overpressure wave into a force that produces a conducted acoustic wave in a target media.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 1A and 1B depict an exemplary overpressure wave generator;

FIG. 3 depicts an exemplary coupling component that includes a coupling chamber a cylinder, a piston, and an earth plate;

FIG. 4 depicts an exemplary coupling component that includes a coupling chamber and a push plate;

FIG. 5A depicts an exemplary coupling component that includes a coupling chamber, a flexible membrane, and a push plate assembly comprising a top plate, a piston rod, a movement constraining vessel, and an earth plate;

FIG. 5B depicts an exemplary coupling component that includes a coupling chamber, a movement constraining vessel, a stabilizing component, a push plate assembly comprising a top plate, a piston rod, and an earth plate, and a stop component;

FIG. 5C depicts the exemplary coupling component of FIG. 5B prior to detonation;

FIG. 5D depicts the exemplary coupling component of FIG. 5B immediately after detonation;

FIG. 5E depicts an exemplary stabilizing component;

FIG. 6 depicts an exemplary coupling component of FIG. 3 with exhaust vent holes shaped to control an exhaust rate;

DETAILED DESCRIPTION OF THE INVENTION

Figure 2:
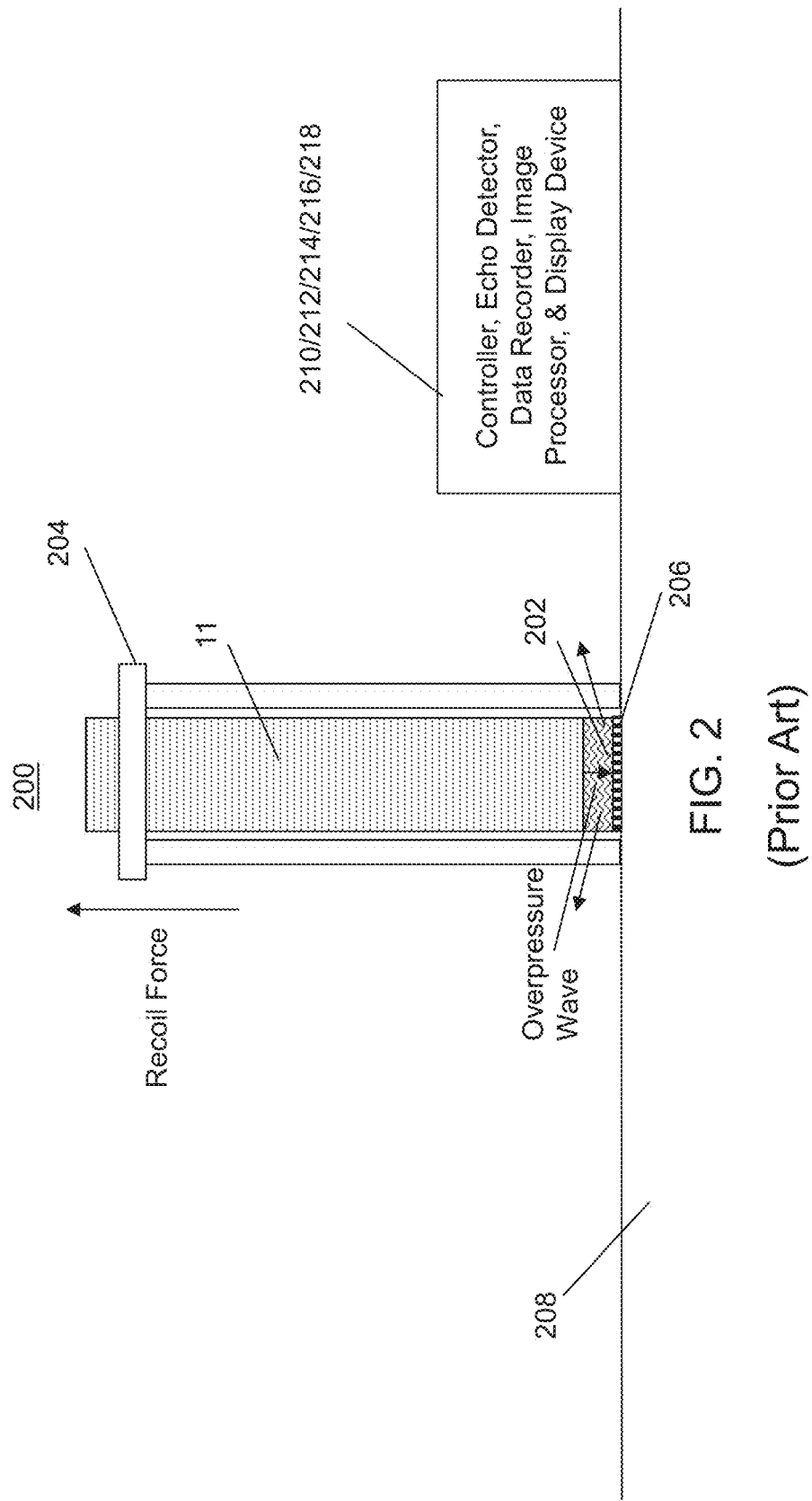
FIG. 2 depicts an exemplary seismic exploration system.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

Certain described embodiments may relate, by way of example but not limitation, to systems and/or apparatuses comprising overpressure wave generators, methods for using overpressure wave generators, and so forth. Example realizations for such embodiments may be facilitated, at least in part, by the use of an emerging, revolutionary overpressure wave generation technology that may be termed direct detonation overpressure wave generation that enables precision timing and amplitude control of detonations and corresponding generated overpressure waves. Alternatively, the technology may be called instantaneous detonation or any other such terminology indicative that detonation is achieved without deflagration, or in other words, without a deflagration to detonation transition (DDT) process. Direct detonation technology was first fully described and enabled in the co-assigned U.S. Pat. No. 7,883,926 issued on Feb. 8, 2011 and entitled "System and Method for Generating and Directing Very Loud Sounds", the co-assigned U.S. Pat. No, 7,886,866 issued on Feb. 15, 2011 and entitled "System and Method for Ignition of a Gaseous or Dispersed Fuel-oxidant Mixture", and the co-assigned U.S. Pat. No. 8,292,022, issued on Oct. 23, 2012 and entitled "System and Method for Generating and Controlling Conducted Acoustic Wave for Geophysical Exploration". The contents of these documents are hereby incorporated herein by reference. A second generation of a direct detonation overpressure wave technology is described and enabled in the co-assigned U.S. Pat. No. 8,302,730, issued on Nov. 6, 2012, and entitled "System and Method for Generating and Controlling Conducted Acoustic Wave for Geophysical Exploration". The contents of this document are hereby incorporated herein by reference.

The present invention pertains to a system and method for coupling an overpressure wave to a target media using a coupling chamber and a push plate assembly and an optional piston. In a first embodiment, a non-flexible piston moveable within a cylinder is adjacent to the coupling chamber, where the piston has piston rings or some other sealing mechanism for providing a substantial seal between the piston and the cylinder. When an overpressure wave is generated, the pressure in the coupling chamber is applied to the piston, which pushes on a push plate assembly that is in direct contact with the target media, where the area sq in) of the surface of the piston to which pressure is applied multiplied by the pressure (psi) in the coupling chamber corresponds to the force produced and conducting into the target media as an acoustic wave and the area of the push plate in contact with the target media determines the distribution of the produced force into the target media, where the area can be determined to correspond to a desired earth psi. The push plate assembly may be an earth plate shaped like a disc, may have a different shape, or comprise multiple attached components, for example, two plates attached by a piston rod. Under one arrangement, as the piston moves downward exhaust is able to escape via exhaust vent holes that are closed by the piston prior to its downward movement, where the shape of the exhaust vent holes can be configured to tailor the exhaust rate.

In a second embodiment of the invention, the coupling component comprises a coupling chamber and a push plate assembly, which is an earth plate that is directly in contact with the target media. The pressure produced in the coupling chamber is applied directly the push plate assembly. For the second embodiment, the amount of area (sq in) of the push plate multiplied by the pressure (psi) produced in the coupling chamber determines the force produced and conducted into the target media as an acoustic wave.

In a third embodiment, the coupling component also comprises a coupling chamber, a flexible membrane, and a push plate assembly except the push plate assembly comprises a top plate that is attached to a piston rod that is attached to a bottom (or earth) plate that is directly in contact with the target media. The top plate and piston rod are movable within a movement constraining vessel. For the third embodiment, the amount of area (sq in) of the flexible membrane that is in contact with the push plate assembly multiplied by the pressure (psi) produced in the coupling chamber determines the force produced and conducted into the target media as an acoustic wave.

In a fourth embodiment, the coupling component comprises a coupling chamber, a movement constraining vessel, a stabilizing component, a push plate assembly comprising a top plate, a piston rod, and an earth plate, and a stop component. The top plate of the push plate assembly and the stabilizing component limit downward movement of the piston rod and the stop component and the lower inner flange of the movement constraining vessel limit the upward movement of the piston rod. For the fourth embodiment, the amount of area (sq in) of the push plate multiplied by the pressure (psi) produced in the coupling chamber determines the force produced and conducted into the target media as an acoustic wave, In accordance with one aspect of the invention, all exhaust gas is forced out one or more exhaust gas escape outlets, where there could be one, two or more exhaust gas escape outlets. A gas escape outlet may include a nozzle to provide a negative thrust. A gas escape outlet may include a muffler. A gas escape outlet may include one or more restrictors for tuning the impulse recover rate of the overpressure wave generator. The recovery rate may be slow to enable low frequency seismic exploration or may be fast for high frequency applications or can be anywhere in between. The restrictors can be tuned to control the amount of the impact of the recoiling overpressure wave generator to eliminate any seismic echo.

DIRECT DETONATION OVERPRESSURE WAVE GENERATOR BACKGROUND

FIGS. 1A and 1B depict an exemplary direct detonation overpressure wave generator. FIG. 1A depicts a detonation tube 100 of an overpressure wave generator 11 being supplied by fuel-oxidant mixture supply 105 via a detonator 114, where a spark ignites within the fuel-oxidant mixture 106 while the detonation tube 100 is being filed with the fuel-oxidant mixture 106 instantly causing detonation at the point of ignition that causes a detonation wave to propagate down the length of the detonation tube 100 and exit its open end 112.

As shown in 1B, the detonator 114 comprises an insulating cylinder 120 surrounding a detonator tube 122, Electrodes 124 are inserted from the sides of insulating cylinder 120 and are connected to high voltage wire 108. The detonator tube 122 is connected to fuel-oxidant mixture supply 105 (shown in FIG. 3B) at a fill point 116 and to a detonation tube 100 at its opposite end. As shown in FIG. 1B, a gas mixture 106 is passed into the detonator tube 122 and then into the detonation tube 100 via a fill point 116 of the detonator 114. When the detonation tube 100 is essentially full, high voltage wire 108 is triggered to cause a spark 118 to occur across electrodes 124 and to pass through the gas mixture 106 flowing into detonator tube 122 to initiate detonation of the gas in the detonation tube 100.

FIG. 2 depicts an exemplary seismic exploration system 200 that includes an overpressure wave generator 11, a coupling component 202, a stabilizing mechanism 204 for controlling the movement of the overpressure wave generator, a controller 210 for controlling the operation of the overpressure wave generator 11, an echo detector 212, a data recorder 214, an image processor 216, and a display device 218. The open end of the overpressure wave generator 11 is configured such that generated overpressure waves are directed towards a target media 208. It should be understood that while the foregoing elements of the system 200 are identified separately, these elements do not necessarily have to be physically separated and can be configured in various alternative ways.

The exemplary overpressure wave generator 11 of system 200 includes a source for producing a spark, a detonation tube, a gas mixture source that provides the flowing gas into the detonation tube, and a detonator. The overpressure wave generator can alternatively comprise a group of detonation tubes that are detonated simultaneously so as to produce a combined overpressure wave. The system 200 can be implemented using one or more nozzles so as to more closely match the impedance of the detonation wave generated by the overpressure wave generator to the impedance of the ambient environment, e.g., the air, thereby reducing the reflection of energy back into the overpressure wave generator, increasing the strength of the overpressure wave that is generated, increasing the resulting force produced by the overpressure wave, and resulting in stronger conducted acoustic waves.

The overpressure wave generator is detonated to generate an overpressure wave. The force of the generated overpressure is coupled by coupling component 202 to a target media 208 such as the ground, ice, or water to produce a conducted acoustic wave. Stabilizing mechanism 204 provides stability to the movement of the overpressure wave generator 11 essentially allowing only up and down movement or substantially preventing movement altogether.

Coupling component 202 may comprise air, a liquid, a spring or may comprise rubber or some comparable compound having desired spring-like and damping characteristics, such as opposing polarity magnets. Coupling component 202 may optionally comprise an impedance transition device 206 as described previously, which directly contacts the target media 208 to impart the conducted acoustic wave. Impedance transition device 206 can have any of various types of shapes. In an exemplary embodiment, the impedance transition device 206 has a flat round shape. Under one arrangement, the impedance transition device 206 of the coupling component 202 corresponds to one or more surfaces of the coupling component 202 and, therefore, is not a separate device.

Whereas the coupling component of FIG. 2 has spring-like and damping characteristics and may include an impedance transition device, the coupling component of the present invention does not and instead comprises a coupling chamber and a push plate assembly that is in contact with a target media. The coupling chamber is substantially sealed at the moment of detonation and the pressure produced in the coupling chamber by a generated overpressure wave is applied to push plate assembly directly or via a piston thereby converting the pressure into a force thereby producing a conducted acoustic wave into the target media.

FIG. 3 depicts a cross-section of an exemplary overpressure wave generator in accordance with a first embodiment of the invention. A detonation tube 100 of an overpressure wave generator lit is attached to a coupling component 202. The detonation tube 100 is oriented to direct a generated overpressure wave towards a target media 208. The coupling component 202 includes a coupling chamber 302, a cylinder 314, a piston 316, and an push plate assembly comprising an earth plate 318, which can be made of a rigid low mass substance such as titanium, aluminum, or composite materials such as carbon composite or fiber glass.

The detonation tube 100 can have a first diameter $d_1$ and the coupling chamber 302 can have a second diameter $d_2$, where the diameter $d_2$ can be less than or greater than the first diameter $d_1$. Alternatively, the coupling chamber could have the same diameter as the detonation tube. The coupling chamber can also have a varying diameter and can have a shape other than a round shape, for example, an oval shape, or rectangular shape, or any other desired shape. The coupling chamber has a volume, v, in which a peak pressure is produced when the overpressure wave is generated, where the volume for a round coupling chamber is a function of its height and diameter. Overall, the diameters d1 and d2 and volume v can be selected to have a desired pressure ratio between the pressure in the detonation tube 100 and the pressure in the coupling chamber 302. For example, the pressure in the detonation tube might be on the order of 500 psi while the pressure in the coupling chamber might be on the order of 130 psi.

The coupling chamber 302 may include an outer flange 304a. The cylinder 314 may include a top outer flange 304b and may include a lower outer flange 304c. A rubber or comparable sealing component 308 can be placed between the outer flange 304a of the coupling chamber 302 and the upper outer flange 304b of the cylinder 314. Bolts 310 can be placed in holes in the two flanges 304a 304b and secured with nuts 312 in order to attach the cylinder 314 to the coupling chamber 302. Alternatively, the coupling chamber 302 and cylinder 314 can be welded together or otherwise be a single component. The area of the top of the piston 316 and the pressure applied to it determine the force converted into a conducted acoustic wave in the target media. The area of the plate 318 that is contact with the target media determines the distribution of the force being applied to the target media. Also shown in FIG. 3 is a vent pipe 320 which could have a nozzle, a muffler, and/or a restrictor.

FIG. 4 depicts a cross-section of an exemplary system 400 comprising a overpressure wave generator 11 attached to a coupling component 202 that includes a coupling chamber 302 and a push plate assembly comprising an earth plate 318. The coupling chamber has an outer flange 304 that rests on the plate 318. Such an arrangement requires operation on very hard surfaces like desert earth, roadways, dams, etc.

FIG. 5A depicts a cross-section of an exemplary system 500 comprising an overpressure wave generator 11 attached to a coupling component 202 that includes a coupling chamber 302, a flexible membrane 506, and a push plate assembly comprising a top plate 504, a piston rod 510, and an earth plate 318 that is in contact with the target media. The movement of the top plate 504 and piston rod 318 are constrained in movement constraining vessel 508. The coupling chamber 302 includes an inner flange 502a that prevents the top plate 504 from moving upward. A rubber or comparable sealing component 308 is placed between the inner flange 502a (and optionally outer flange 304a) and the flexible membrane 506. The movement constraining vessel has an upper outer flange 304b and an inner flange 502b where the top plate 504 can move between the flexible membrane 506 and the inner flange 502b. The top plate 504 and earth plate 318 may be rigid disks having low mass and strength such as titanium, aluminum, or composite materials such as carbon composite or fiber glass. The piston rod 510 and movement constraining vessel may each be pipes that are also rigid and low mass and may be titanium, aluminum, or composite materials such as carbon composite or fiber glass.

FIG. 5B depicts a cross-section of an exemplary system 520 comprising an overpressure wave generator 11 attached to a coupling component 202 that includes a coupling chamber 302, a flexible membrane 506, and a push plate assembly comprising a top plate (or piston) 504, a piston rod 510, and an earth plate 318 that is in contact with the target media. The downward movement of the top plate 504 and piston rod 318 are constrained in movement constraining vessel 508. The coupling chamber 302 includes an outer flange 304a. A rubber or comparable sealing component 308 is placed between the outer flange 304a of the coupling chamber 302 and the upper outer flange 304b of the movement constraining vessel 508. The movement constraining vessel has an upper outer flange 304b, a lower inner flange 502, and includes a stabilizing component 522, where the top plate 504 can move downward until it strikes the stabilizing component 522. The stabilizing component is shown being slightly above the lower inner flange 502 for clarity's sake) but can instead be abutted against the lower inner flange 502. The stabilizing component can be any type of mechanism that constrains movement of the piston rod 510 to only movement that is parallel to the sides of the coupling chamber and movement constraining vessel 508.

A stop component 524, for example a doughnut-shaped rubber stop component, is depicted between the earth plate 318 and the lower inner flange 502 of the movement constraining vessel. Its purpose is to prevent the metal lower inner flange 502 from striking the metal earth plate 318 and thereby prevent the sound of metal striking metal from being produced. Although a rubber stop component 524 is described herein, any other desired material could be used instead of rubber. For clarity's sake, the rubber stop component 524 is depicted being slightly below the lower inner flange 502. However, in normal operation, the lower inner flange 502 could rest upon the rubber stop component 524 prior to detonation such as depicted in FIG. 5C. The thicknesses of the rubber stop 318 and stabilizing component 522 can be selected to limit the movement of the piston rod 510 during a. detonation to a desired distance (e.g., three inches). This limiting of movement can be visualized by comparing FIGS. 5C and 5D, which depict the location of the piston rod 510 prior to detonation and immediately after detonation, respectively. As with exemplary system 500, the top plate 504 and earth plate 318 of system 520 may be rigid disks having low mass and strength such as titanium, aluminum, or composite materials such as carbon composite or fiber glass. The piston rod 510 and movement constraining vessel 508 may each be pipes that are also rigid and low mass and may be titanium, aluminum, or composite materials such as carbon composite or fiber glass.

FIG. 5E depicts a cross section of an exemplary stabilizing component 522. Referring to FIG. SE stabilizing component 522 comprises four discs 522a-522d, two O-rings 526a 526b, a grease spreading component 528a, and at least one grease port 530a. The stabilizing component 522 could be a circular ring or multiple rings attached together. In FIG. 5E, stabilizing component 522 comprises four circular rings 522a-522d that are attached by bolts (not shown), which can be loosened to allow the piston rod 510 to be placed into the movement constraining vessel 508, after which the bolts can be tightened causing the O-rings 526a 526b to press against the piston rod 510. During operation, a grease pump (not shown) can periodically provide grease to the at least one grease port 530a, where the grease is spread by the grease spreading component 528a during operation of the device. FIG. 5E also depicts O-rings 526c 526d on the outside of the top plate (or piston) 504, where during operation, grease is periodically provided to at least one grease port 530b and the grease is spread by a grease spreading component 528b. One skilled in the art will recognize that all sorts of stabilizing approaches can be employed to include having O-rings integrated into the piston rod, use of a bushing, use of a rubber doughnut-shape ring similar to the stop component, and the like.

FIG. 6 depicts an exemplary coupling component 202 of FIG. 3 with exhaust vent holes 602 shaped to control an exhaust rate. Under one arrangement the holes may be shaped similar to a tear drop.

Figure 7:
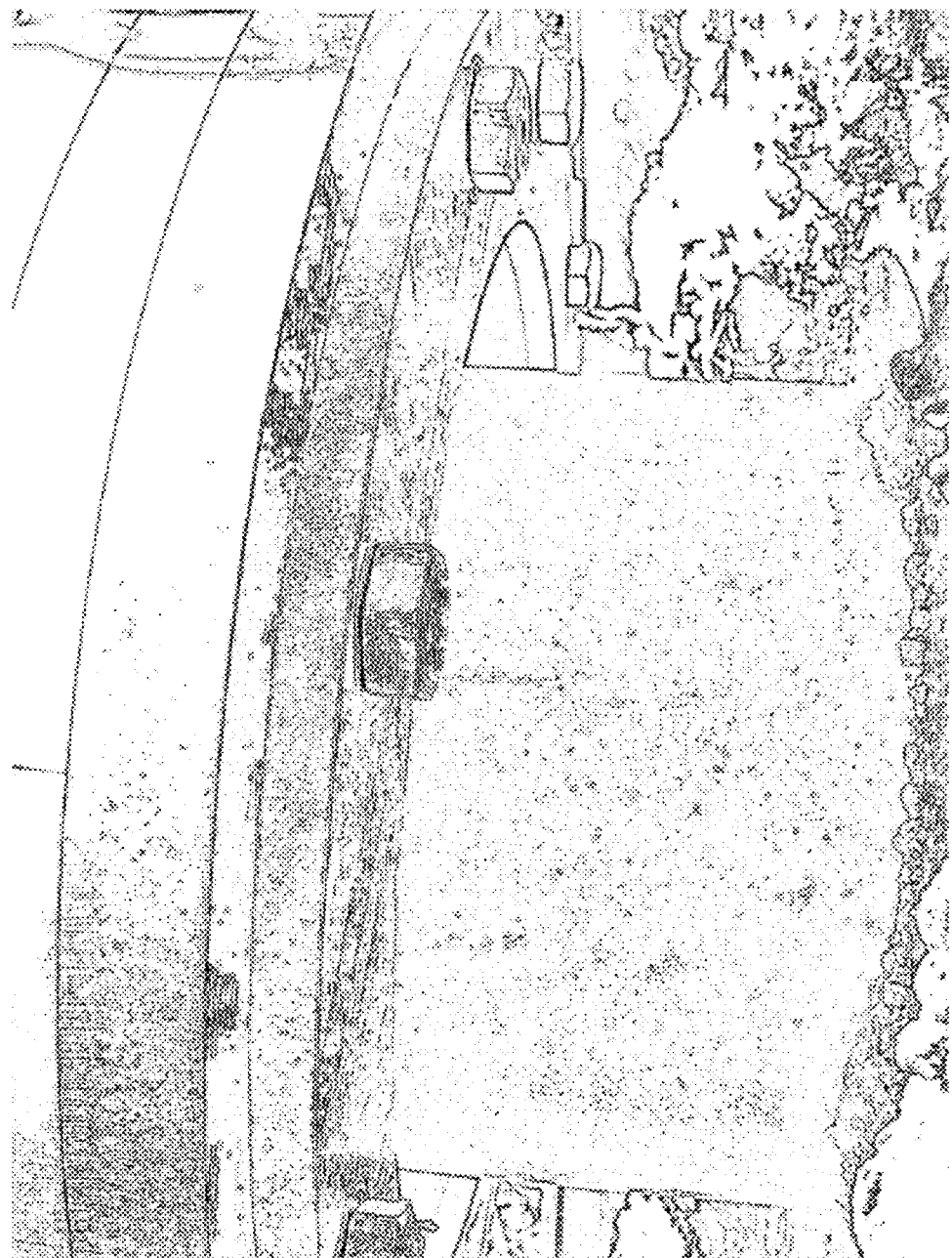
FIG. 7 depicts the piston rod and second plate of an operational overpressure wave generator.

FIG. 7 depicts the piston rod and earth plate of an operational overpressure wave generator.

Figure 8:
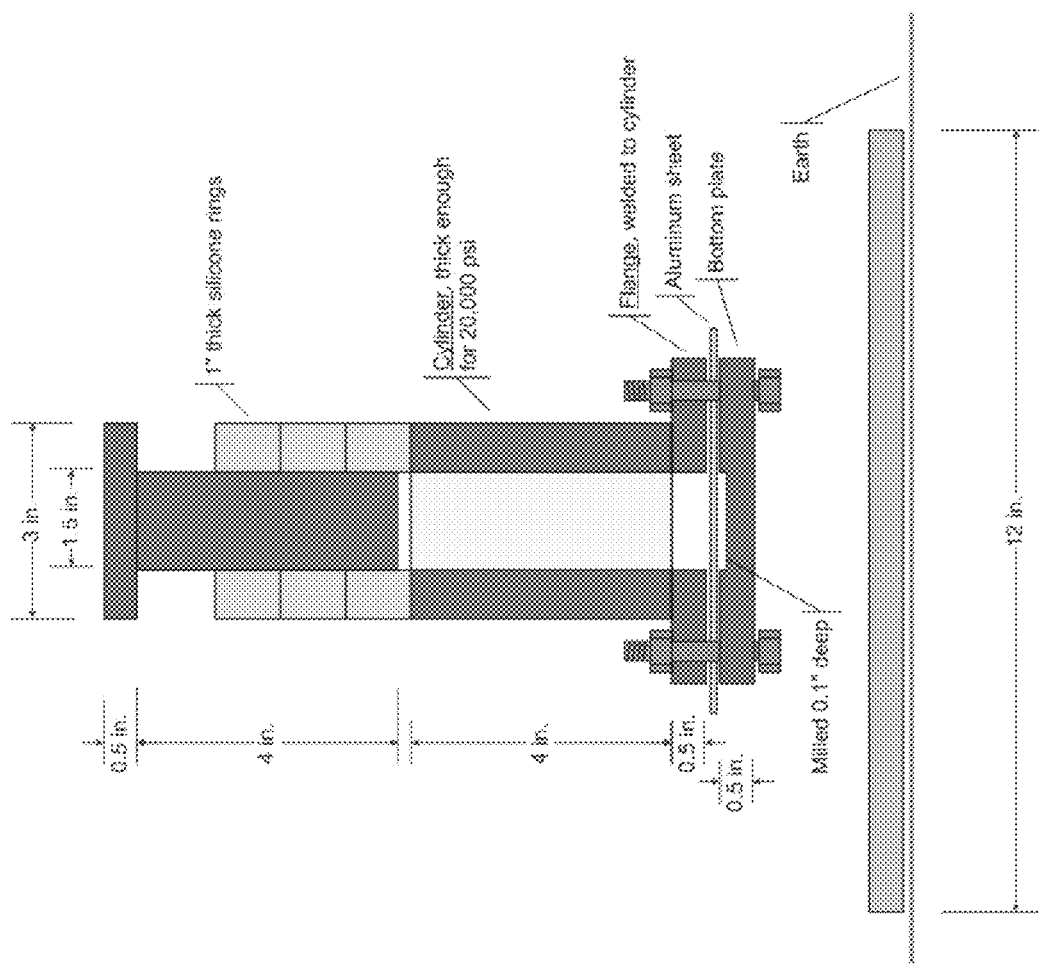
FIG. 8 depicts an exemplary overpressure wave generator configured to form metal.

FIG. 8 depicts an exemplary overpressure wave generator configured to form metal.

One skilled in the art will recognize that although this disclosure involves a single coupling component being attached to a single detonation tube from a single overpressure wave generator, all sorts of combinations of multiple detonation tubes and/or multiple overpressure wave form generators and a single coupling component are possible as well as combinations of multiple coupling components, which might interact with a common earth plate.

Under one arrangement, one or more overpressure wave generators directing overpressure waves towards a target media could be combined with one or more overpressure wave generators directing overpressure waves away from the target media could be attached and their combined generated forces balanced to prevent recoil of the system.

While particular embodiments of the invention have been described, it will be understood, however, that the invention is not limited thereto, since modifications may be made by those skilled in the art, particularly in tight of the foregoing teachings.

The invention claimed is:

1. A seismic exploration system, comprising:
an overpressure wave generator for generating an overpressure wave; and
a coupling component for converting a pressure of said overpressure wave into a force that produces a conducted acoustic wave in a target media, said coupling component comprising:
a coupling chamber for receiving said overpressure wave from said overpressure wave generator;
a push plate assembly, comprising:
a top plate;
a piston rod; and
an earth plate;
a movement constraining vessel for constraining movement of said push plate assembly resulting from said coupling chamber receiving said overpressure wave, said movement constraining vessel comprising;
a stabilizing component for constraining movement of said piston rod to only movement that is substantially parallel to the sides of the coupling chamber and the movement constraining vessel; and a sealing component for substantially sealing said coupling component during generation of said overpressure wave; and a stop component for preventing said movement constraining vessel from striking said earth plate.

2. The seismic exploration system of claim 1, wherein said top plate and said stabilizing component are configured to limit downward movement of said piston rod.

3. The seismic exploration system of claim 1, wherein said earth plate, said stop component, and said movement constraining vessel are configured to limit upward movement of said piston rod.

4. The seismic exploration system of claim 1, wherein said stop component prevents the sound of metal striking metal from being produced by the movement constraining vessel and the earth plate.

5. The seismic exploration system of claim 1, wherein said stop component is a rubber stop component.

6. The seismic exploration system of claim 1, wherein the thicknesses of said stop component and said stabilizing component determine the distance the piston rod can move.

7. The seismic exploration system of claim 1, wherein said overpressure wave generator comprises a detonator and a detonation tube, wherein said overpressure wave travels through said detonation tube and into said coupling chamber.

8. The seismic exploration system of claim 7, wherein said detonation tube has a first diameter and said coupling chamber has a second diameter.

9. The seismic exploration system of claim 1, wherein said coupling chamber is made of one of titanium, aluminum, a composite material, or steel.

10. The seismic exploration system of claim 1, wherein said coupling chamber has a round shape.

11. The seismic exploration system of claim 1, further comprising: a vent pipe.

12. The seismic exploration system of claim 11, wherein said vent pipe has at least one of a nozzle, a muffler, or a restrictor.

13. The seismic exploration system of claim 1, wherein said sealing component comprises a plurality of circular rings and one or more 0-rings.

14. The seismic exploration system of claim 13, wherein said plurality of circular rings are attached together by bolts that can be loosened to allow the piston rod to be placed into the movement constraining vessel after which the bolts can be tightened to cause the one or more 0-rings to press against the piston rod to substantially seal said coupling component.

15. The seismic exploration system of claim 1, wherein said stabilizing component comprises a grease port.

16. The seismic exploration system of claim 1, wherein said stabilizing component comprises at least one of a bushing or a grease spreading component.

17. The seismic exploration system of claim 1, further comprising: at least one vent hole.

18. The seismic exploration system of claim 1, wherein one or more 0-rings are integrated into at least one of said top plate or said piston rod.

19. The seismic exploration system of claim 1, wherein said overpressure wave generator is a direct detonation overpressure wave generator.

20. A seismic exploration method, comprising:
generating an overpressure wave using a direct detonation overpressure wave generator, and
converting a pressure of said overpressure wave into a force, in a sealed coupling chamber, that produces a conducted acoustic wave in a target media.

* * * * *